(12) United States Patent
Shang

(10) Patent No.: US 7,315,420 B2
(45) Date of Patent: *Jan. 1, 2008

(54) CWDM FILTER WITH FOUR CHANNELS

(75) Inventor: Chang Chen E Shang, Taichung (TW)

(73) Assignee: Asia Optical Co., Inc., Taichung (TW)

( * ) Notice: Subject to any disclaimer, the term of this patent is extended or adjusted under 35 U.S.C. 154(b) by 179 days.

This patent is subject to a terminal disclaimer.

(21) Appl. No.: 11/171,340

(22) Filed: Jul. 1, 2005

(65) Prior Publication Data

US 2006/0018022 A1    Jan. 26, 2006

(30) Foreign Application Priority Data

Jul. 21, 2004   (TW) .............................. 93121777 A

(51) Int. Cl.
G02B 27/00  (2006.01)
G02B 5/28   (2006.01)
G02F 1/07   (2006.01)

(52) U.S. Cl. ...................... 359/579; 359/588; 359/589; 359/260

(58) Field of Classification Search ................ 359/578, 359/579, 588, 589, 260
See application file for complete search history.

(56) References Cited

U.S. PATENT DOCUMENTS

| 5,999,322 | A  | * | 12/1999 | Cushing | ...................... 359/589 |
| 6,831,784 | B2 | * | 12/2004 | Takeda  | ........................ 359/579 |
| 2006/0012882 | A1 | * | 1/2006 | Shang | .......................... 359/586 |

* cited by examiner

*Primary Examiner*—Audrey Chang

(57) ABSTRACT

A CWDM filter having four channels of the present invention comprises a substrate and odd number of stack structures. Each stack structure includes a first multi-layer stack, a spacer layer, a second multi-layer stack and a coupling layer arranged in turn from the side thereof approaching the substrate. The rules of the coupling layer of the No. [(N+1)/2−1] stack structure and the coupling layer of the No. [(N+1)/2+1] stack structure both are (2n+1)L, among which, n being a positive whole number, L representing for a low refraction index layer with a thickness of $\lambda_0/4$ and $\lambda_0$ representing for the center wavelength thereof. While the coupling layers of the other stack structures can be expressed as L.

16 Claims, 3 Drawing Sheets

US 7,315,420 B2

CWDM FILTER WITH FOUR CHANNELS

TECHNICAL FIELD

The present invention relates to an optical filter, especially to a CWDM (coarse wavelength division multiplex) filter which has four channels thereof

DESCRIPTION OF RELATED ARTS

Optical filters are components for selecting a desired wavelength range which have been playing an important role in optical fiber communication systems and optical detecting systems. Normally, optical filters have active type and passive type, among which the passive type optical filters are based on lens, diffraction grating and spectrum (frequency) filter, while the active type optical filter can be the combination of proper passive components and periodic detectors, wherein each periodic detector is tuned to a specific frequency.

There is an interference film type optical filter among the passive ones. The interference film optical filters commonly are commonly composed of materials of high and/or low refraction indexes, whose thicknesses usually are preset to be multiples of a quarter of the wavelength of the incident light thereof. The materials are often deposited on a substrate made of glass or similar materials so as to achieve specific wavelength response characters as required. Normally, a medium film interference optical filter is consisted of stacks of high and low refraction index layers (films) which are alternately superposed over each other and whose thicknesses are normally multiples of a quarter wavelength ($\lambda/4$) of the center wavelength of a desired wavelength range for the filter. The phases of the lights reflected within the high refraction index layers remain unchanged while the phases of the lights reflected within the low refraction index layers deflect 180°.

Due to the differences of the traveling distances (multiples of $2*\lambda/4$) between different lights, lights reflected in turn will become superposed together as they proceed ahead thereby producing a light beam having a high intensity within a narrow wavelength range, while the amount of other reflected output lights, which are outside of the narrow wavelength range, will have a sharp decrease. Hence, such kind of filters is commonly used to make high pass optical filters, low pass optical filters or high reflective film components. Furthermore, as the optic characters thereof depend on the reflection and transmission characters of the optical films thereof, such films are usually adopted to manufacture band-pass filters, low-pass filters, high-pass filters or band-reject filters.

FIG. 2 shows a prior art CWDM optical filter with four channels. The whole multi-layer structure of this filter can be expressed as: $N_G$/L(HLH)4L(HLH)L(HLH)2L(HLH)L(HLHLH)2L(HLHLH)L(HLH)4L(HLH)L(HLHLH)2L(HLH)L(HLH)4L(HLH)L(HLHLH)2L(HLHLH)L(HLH)4L(HLH)L(HLHLH)2L(HLHLH)L(HLH)4L(HLH)L(HLHLH)2L(HLHLH)L(HLH)2L(HLH) L(HLH)4L(HLH)/$N_S$. Among which, $N_S$ is the refraction index of the substrate thereof and equals to 1.658; $N_O$ represents for an air layer; L represents for a low refraction index layer with a thickness of $\lambda_O/4$; H represents for a high refraction index layer with a thickness of $\lambda_O/4$; and $\lambda_O$ is the center wavelength thereof. Referring to FIG. 2, the No. 67 layer and the No. 87 layer thereof are both coupling layers thereof, and both are low refraction index layers with a thickness of one multiple of $\lambda_O/4$.

The correspondent spectrum characteristics graph for the above prior art filter please refer to FIG. 3. The No. 67 and 87 layers of the filter both have a thickness of one multiple of $\lambda_O/4$, and relatively big interference ripples will occur at the two channels within the wavelength ranges of 1500-15-5 nm and 1575-1580 nm when using the prior art filter. In order to avoid the phenomena, commonly the last two layers of the filter will be designed to have thicknesses thereof to be non multiples of $\lambda_O/4$ so as to try to perform the so-called "optimization process". However, the so-called "optimization process" is usually very complex and thus the manufacture costs thereof will be increased inevitably.

SUMMARY OF THE INVENTION

A main object of the present invention is to provide a CWDM (coarse wavelength division multiplex) filter which has four channels thereof so as to reduce the loss of the CWDM assembly as a whole.

In order to achieve the objects as set forth, a CWDM filter is provided to comprise a substrate and a plurality of stack structures thereon. The amount of the stack structures thereof is N and N is an odd number no less than 2. Each stack structure, from the side thereof approaching the substrate, includes a Fabry-Perot cavity structure and a coupling layer.

To be more detailed, each stack structure of the filter in accordance with the present invention comprises a first multi-layer stack, a spacer layer, a second multi-layer stack and a coupling layer. Moreover, the first and second multi-layer stacks are symmetric relative to the spacer layer thereof.

The spacer layer can be expressed as kL. k is a positive whole number no less than 2 and better to be a positive even number. L represents for a low refraction index layer with a thickness of $\lambda_O/4$, and $\lambda_O$ is the center wavelength thereof.

Furthermore, the coupling layer of the No. [(N+1)/2−1] stack structure of the present invention and the coupling layer of the No. [(N+1)/2+1] stack structure thereof can both expressed as (2n+1)L. Among which, n is a positive whole number, L means a low refraction index layer with a thickness of $\lambda_O/4$, and $\lambda_O$ is the center wavelength thereof.

The rule of each Fabry-Perot cavity structure, in turn from the side thereof approaching the substrate thereof, is H(LH)$^a$kL(HL)$^a$H. Wherein, a is a positive whole number, k is a whole number no less than 2, L represents for a low refraction index layer with a thickness of $\lambda_O/4$, H represents for a high refraction index layer with a thickness of $\lambda_O/4$, and $\lambda_O$ is the center wavelength thereof. Among which, the first multi-layer stack thereof can be expressed as H(LH)$^a$ and the second multi-layer stack thereof can be expressed as (HL)$^a$H.

The coupling layers of the other stack structures can be expressed as L, L means a low refraction index layer with a thickness of $\lambda_O/4$, and $\lambda_O$ is the center wavelength thereof.

When the CWDM filter in accordance with the present invention is performed to provide four channels of 1510 nm, 1530 nm, 1550 nm and 1570 nm thereof, the rules for the Fabry-Perot cavity structures, in turn from the sides thereof approaching the substrate thereof, are: HLH4LHLH ↘ HLH2LHLH ↘ H(LH)$^2$2L(HL)$^2$H ↘ HLH4LHLH ↘ H(LH)$^2$2L(HL)$^2$H ↘ HLH4LHLH ↘ H(LH)$^2$2L(HL)$^2$H ↘ HLH4LHLH ↘ H(LH)$^2$2L(HL)$^2$H ↘ HLH4LHLH ↘ H(LH)$^2$2L(HL)$^2$H ↘ HLH2LHLH ↘ HLH4LHLH.

The center wavelength $\lambda_O$ of the filter of the present invention is 1540 nm. In addition, the coupling layers, from the sides thereof approaching the substrate thereof, can be expressed as: L、L、L、L、L、L、3L、L、3L、L、L、L、L、L、L.

The key points of the CWDM optical filter having four channels thereof in accordance with the present invention are: low refraction index coupling layers with thicknesses of odd multiples of $\lambda_O/4$ are adopted to reduce the interference ripples phenomena as mentioned above. Thus, the light transmission rate of the whole optical filter can be enhanced thereby decreasing the whole loss of an assembled CWDM using the filter of the present invention.

Other objects, advantages and novel features of the invention will become more apparent from the following detailed description when taken in conjunction with the accompanying drawings.

DETAILED DESCRIPTION OF PREFERRED EMBODIMENT

Details will be given with the combination of the figures thereof to the CWDM (coarse wavelength division multiplex) filter 1 having four channels thereof in accordance with the present invention as follows.

Figure 1:
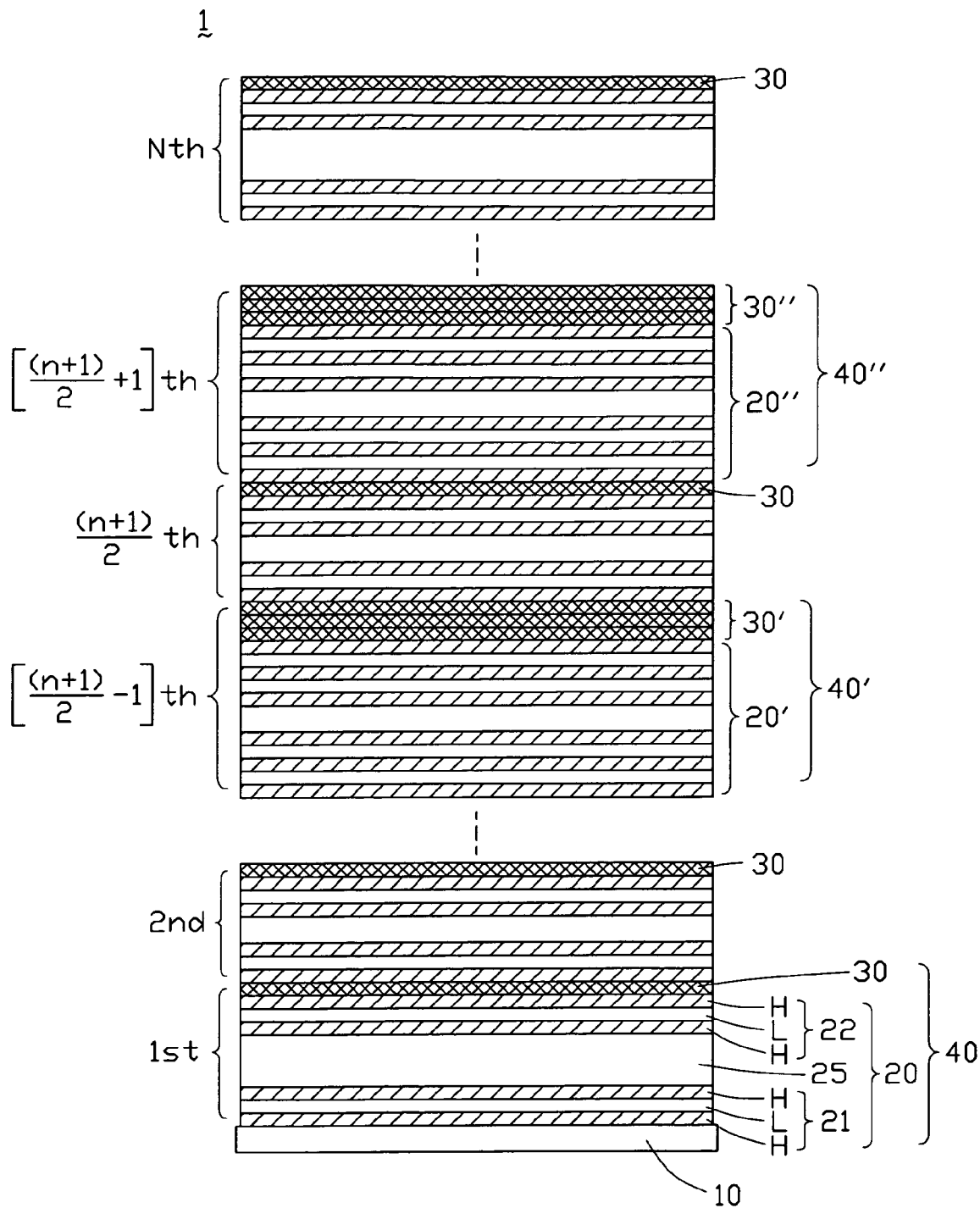
FIG. 1 is a sketch view of the multi-layer structure of the optical filter having four channels in accordance with the present invention.
Figure 2:
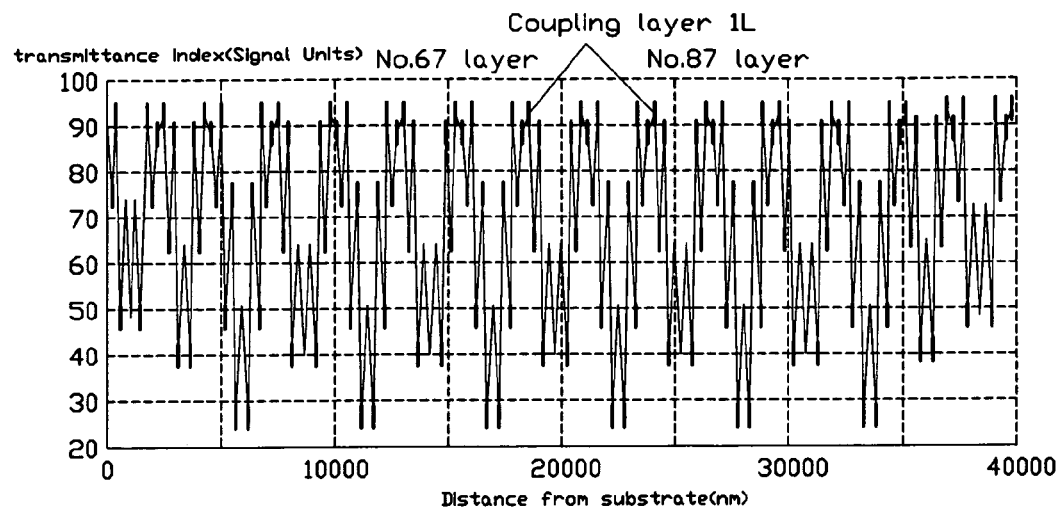
FIG. 2 is a sketch view showing the relationship between the whole multi-layer structure of a prior art optical filter and the corresponding light transmission rate thereof.
Figure 3:
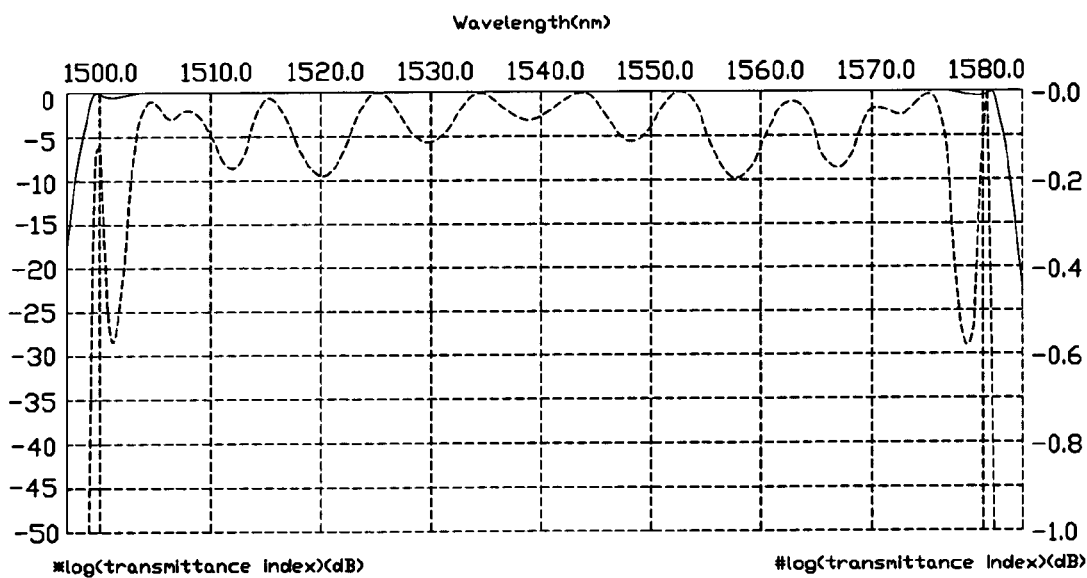
FIG. 3 is the spectrum characteristics graph of the prior art filter as shown in FIG. 2.

Referring to FIG. 1, a CWDM filter 1 having four channels thereof in accordance with the present invention is provided herewith. The filter 1 comprises a substrate 10 and a plurality of stack structures 40. The amount of the stack structures 40 is N and N is an even number no less than 2. Each stack structure, from the side thereof approaching the substrate 10 thereof, includes a first multi-layer stack 21, a spacer layer 25, a second multi-layer stack 22 and a coupling layer 30 thereof. And, a first multi-layer stack 21, a spacer layer 25 and a second multi-layer stack 22 make up of a Fabry-Perot cavity structure 20. Moreover, the first and second multi-layer stacks 21, 22 are symmetric relative to the spacer layer 25. The spacer layer 25 can be expressed as kL, k being a positive whole number no less than 2 and better to be a positive odd number.

Figure 4:
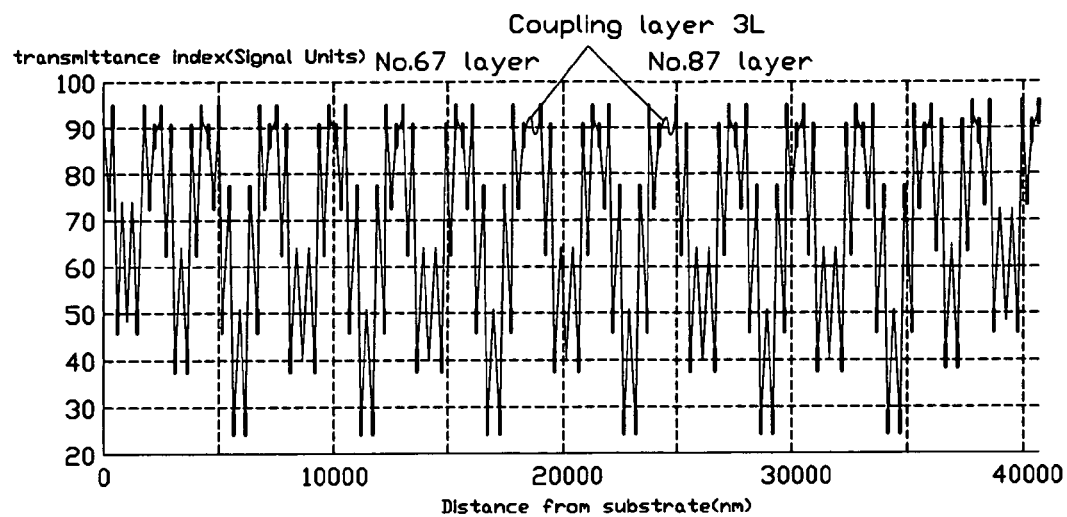
FIG. 4 is a sketch view showing the relationship between the whole multi-layer structure of the CWDM filter of the present invention and the corresponding light transmission rate thereof.

With reference to FIG. 1 and FIG. 4, the coupling layer 30' of the No. [(N+1)/2−1] stack structure 40' and the coupling layer 30" of the No. [(N+1)/2+1] stack structure 40" can both be expressed as (2n+1)L. n is a positive whole number, L represents for a low refraction index layer with a thickness of $\lambda_O/4$, and $\lambda_O$ is the center wavelength thereof. On the other hand, the coupling layers 30 of the other stack structures 40 are L, L means a low refraction index layer with a thickness of $\lambda_O/4$, $\lambda_O$ is the center wavelength thereof.

The rule of each Fabry-Perot cavity structure, in turn from the side thereof approaching the substrate 10 thereof, is H(LH)$^a$kL(HL)$^a$H. Wherein, a is a positive whole number, k is a whole number no less than 2, L represents for a low refraction index layer with a thickness of $\lambda_O/4$, H represents for a high refraction index layer with a thickness of $\lambda_O/4$, and $\lambda_O$ is the center wavelength thereof. Among which, the first multi-layer stack thereof can be expressed as H(LH)$^a$ and the second multi-layer stack thereof can be expressed as (HL)$^a$H.

When the CWDM optical filter in accordance with the present invention is performed to provide four channels of 1510 nm, 1530 nm, 1550 nm and 1570 nm thereof, the rules for the Fabry-Perot cavity structures, in turn from the sides thereof approaching the substrate thereof, are: HLH4LHLH、HLH2LHLH、H(LH)$^2$2L(HL)$^2$H、HLH4LHLH、H(LH)$^2$2L(HL)$^2$H、HLH4LHLH、H(LH)$^2$2L(HL)$^2$H、HLH4LHLH、H(LH)$^2$2L(HL)$^2$H、HLH4LHLH、H(LH)$^2$2L(HL)$^2$H、HLH4LHLH、H(LH)$^2$2L(HL)$^2$H、HLH2LHLH、HLH4LHLH.

The center wavelength $\lambda_O$ of the filter of the present invention is 1540 nm. In addition, the coupling layers, from the sides thereof approaching the substrate thereof, can be expressed as: L、L、L、L、L、L、3L、L、3L、L、L、L、L、L.

The CWDM filter 1 of the present invention comprises a plurality of Fabry-Perot cavity structures 20 which are stacked over each other and the thicknesses of the layers thereof are $\lambda_O/4$. The amount of the cavity structures 20 may be 15, for example. In the meantime, the filter 1 has four channels thereof, that is, channels of 1510 nm, 1530 nm, 1550 nm and 1570 nm. The center wavelength $\lambda_O$ of the filter 1 is located at the center point of the four optical channels as above, and the value of the center wavelength is 1540 nm. Moreover, the thicknesses of all the layers thereof equal to $\lambda_O/4$.

In addition, each of the coupling layers 30 adopts a thickness of $\lambda_O/4$. Each Fabry-Perot resonance cavity structure 20 is consisted of two odd numbered or even numbered multi-layer stacks. Moreover, the spacer layer 25 of each Fabry-Perot cavity structure 20 is a low refraction index layer with a thickness of odd multiples of $\lambda_O/4$.

On the other hand, the coupling layers 30 of the No. 67 and 87 layers thereof are low refraction index layers which each have a thickness of (2n+1) multiples of $\lambda_O/4$. In an exemplary embodiment of the present invention, the thicknesses of the two coupling layers 30 are appropriate to be three multiples of $\lambda_O/4$.

The surface polishing diameter of the substrate 10 thereof is 90 mm, and the thickness thereof is 10 mm. The substrate 10 can contain such materials or elements as $SiO_2$, Barium, Lithium and Natrium therein. The low refraction index layers can adopt $SiO_2$ layers, and the high refraction index layers can be TaO. The maximal transmittance index of the CWDM filter 1 of the present invention is higher than 90%, and the band pass thereof is 1502-1578 nm. The refraction index of the low refraction index layers thereof is 1.44, while the refraction index of the high refraction index layers thereof is 2.1-2.5.

FIG. 4 shows the exemplary embodiment of the present invention. In this figure, the first layer of the filter 1 of the present invention is the one at the utmost left side thereof and the other layers thereof are arranged from left to right starting from the first layer. Among which, the No. 87 and 67 layers are coupling layers and are low refraction index layers with thicknesses of 3 multiples of $\lambda_O/4$.

Figure 5:
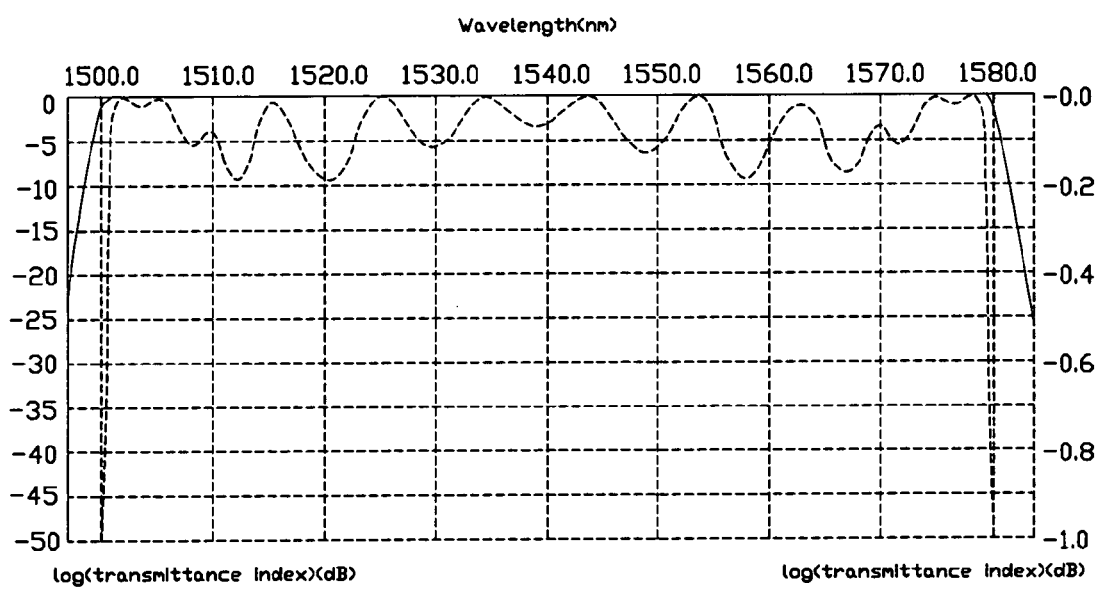
FIG. 5 is the spectrum characteristics graph of the CWDM filter in accordance with the present invention.

FIG. 5 is the correspondent spectrum characteristics graph of the embodiment as shown in FIG. 4. We may see from FIG. 5 that the noise ripples in the two wavelength ranges of 1500-1505 nm and 1575-1580 nm have been eliminated, and the whole light transmission rate of the filter 1 is thus increased accordingly.

The key points of the CWDM optical filter having four channels thereof in accordance with the present invention are: low refraction index coupling layers 30 with thicknesses of odd multiples of $\lambda_O/4$ are adopted to reduce the interference ripples phenomena of the prior arts as mentioned above. Thus, the light transmittance index of the whole optical filter can be enhanced thereby decreasing the whole loss of an assembled CWDM using the filter of the present invention. Hence, the whole design of the filter 1 of the present invention does not need to adopt layers with thicknesses of non multiples of $\lambda_O/4$, thereby making corresponding manufacture process simple and the costs thereof reduced accordingly.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

The invention claimed is:

1. A CWDM filter comprising: a substrate and an N number of stack structures with N being an odd number not less than 2, each stack structure including a Fabry-Perot cavity structure and a coupling layer in order from the substrate side; wherein a structure of the coupling layer for the [(N+1)/2−1] stack structure and the [(N+1)/2+1] stack structure is expressed as (2n+1)L, and the structure of the coupling layer for the other stack structures is expressed as L, among which, n is a positive whole number, L represents a low refraction index layer having a thickness of $\lambda_0/4$ and $\lambda_0$ represents the center wavelength.

2. The CWDM filter as claimed in claim 1, wherein the structure of each Fabry-Perot cavity structure, in order from the substrate side, is expressed as $H(LH)^a kL(HL)^a H$, in which a is a positive whole number, k is a whole number not less than 2, L represents a low refraction index layer having a thickness of $\lambda_O/4$, H represents a high refraction index layer having a thickness of $\lambda_O/4$, and, $\lambda_O$ represents the center wavelength.

3. The CWDM filter as claimed in claim 2, wherein k is an even number not less than 2.

4. The CWDM filter as claimed in claim 2, wherein the structures for the Fabry-Perot cavity structures, in order from the substrate side, are: HLH4LHLH ↘ HLH2LHLH ↘ H(LH)²2L(HL)²H ↘ HLH4LHLH ↘ H(LH)²2L(HL)²H ↘ HLH4LHLH ↘ H(LH)²2L(HL)²H ↘ HLH4LHLH ↘ H(LH)²2L(HL)²H ↘ HLH4LHLH ↘ H(LH)²2L(HL)²H ↘ HLH4LHLH ↘ H(LH)²2L(HL)²H ↘ HLH2LHLH ↘ HLH4LHLH.

5. The CWDM filter as claimed in claim 4, wherein the coupling layers, in order from the substrate side, are respectively expressed as: L ↘ L ↘ L ↘ L ↘ L ↘ L ↘ 3L ↘ L ↘ 3L ↘ L ↘ L ↘ L ↘ L ↘ L.

6. A CWDM filter comprising: a substrate and an N number of stack structures with N being an odd number not less than 2, each stack structure including a first multi-layer stack, a spacer layer, a second multi-layer stack and a coupling layer in order from the substrate side; wherein a structure of the coupling layer for the [(N+1)/2−1] stack structure and the [(N+1)/2+1] stack structure are expressed as (2n+1)L, and the structure of the coupling layer for the other stack structures is expressed as L, which n is a positive whole number, L represents a low refraction index layer having a thickness of $\lambda_0/4$ and $\lambda_0$ represents the center wavelength.

7. The CWDM filter as claimed in claim 6, wherein the first and second multi-layer stacks are symmetric relative to the spacer layer.

8. The CWDM filter as claimed in claim 7, wherein the structure of the first multi-layer stack is expressed as $H(LH)^a$ and the structure of the second multi-layer stack is expressed as $H(LH)^a H$, in which a is a positive whole number, L represents a low refraction index layer having a thickness of $\lambda_O/4$, H represents a high refraction index layer with having a thickness of $\lambda_O/4$, and $\lambda_O$ represents the center wavelength.

9. The CWDM filter as claimed in claim 8, wherein the spacer layer is expressed as kL, k representing a positive whole number not less than 2.

10. The CWDM filter as claimed in claim 9, wherein k is a positive even number.

11. The CWDM filter as claimed in claim 10, wherein the first multi-layer stack, the spacer layer and the second multi-layer stack constitute a Fabry-Perot cavity structure, the structures for the Fabry-Perot cavity structures, in order from the substrate side, are: HLH4LHLH ↘ HLH2LHLH ↘ H(LH)²2L(HL)²H ↘ HLH4LHLH ↘ H(LH)²2L(HL)²H ↘ HLH4LHLH ↘ H(LH)²2L(HL)²H ↘ HLH4LHLH ↘ H(LH)²2L(HL)²H ↘ HLH4LHLH ↘ H(LH)²2L(HL)²H ↘ HLH4LHLH ↘ H(LH)²2L(HL)²H ↘ HLH2LHLH ↘ HLH4LHLH.

12. A CWDM filter comprising: a substrate and an odd number of stack structures, each stack structure including a spacer layer, a first multi-layer stack and a second multi-layer stack symmetrically arranged relative to the spacer layer, and a coupling layer; wherein a structure of the coupling layer for the [(N+1)/2−1] stack structure and the [(N+1)/2+1] stack structure are expressed as (2n+1)L, and the structure of the coupling layer for the other stack structures is expressed as L, in which n is a positive whole number, L represents a low refraction index layer with having a thickness of $\lambda_O/4$ and $\lambda_O$ represents the center wavelength.

13. The CWDM filter as claimed in claim 12, wherein the structure of the first multi-layer stack is expressed as $H(LH)^a$ and the structure of the second multi-layer stack is expressed as $(HL)^a H$, in which a is a positive whole number, L represents a low refraction index layer having a thickness of $\lambda_O/4$, H represents a high refraction index layer having a thickness of $\lambda_O/4$, and $\lambda_O$ represents the center wavelength.

14. The CWDM filter as claimed in claim 13, wherein the spacer layer is expressed as kL, k representing a positive whole number not less than 2.

15. The CWDM filter as claimed in claim 14, wherein k is a positive even number.

16. The CWDM filter as claimed in claim 15, wherein the structure for each stack structure in order from the substrate side, is expressed as: [HLH ↘ 4L ↘ HLH ↘ L] ↘ [HLH ↘ 2L ↘ HLH ↘ L] ↘ [H(LH)² ↘ 2L ↘ (HL)²H ↘ L] ↘ [HLH ↘ 4L ↘ HLH ↘ L] ↘ [H(LH)² ↘ 2L ↘ (HL)²H ↘ L] ↘ [HLH 0 ↘ 4L ↘ HLH ↘ L] ↘ [H(LH)² ↘ 2L ↘ (HL)²H ↘ 3L] ↘ [HLH ↘ 4L ↘ HLH ↘ L] ↘ [H(LH)² ↘ 2L ↘ (HL)²H ↘ 3L] ↘ [HLH ↘ 4L ↘ HLH ↘ L] ↘ [H(LH)² ↘ 2L ↘ (HL)²H ↘ L] ↘ [HLH ↘ 4L ↘ HLH ↘ L] ↘ [H(LH)² ↘ 2L ↘ (HL)²H ↘ L] ↘ [HLH ↘ 2L ↘ HLH ↘ L] ↘ [HLH ↘ 4L ↘ HLH ↘ L].

* * * * *